United States Patent
Koudas et al.

(10) Patent No.: US 7,904,444 B1
(45) Date of Patent: Mar. 8, 2011

(54) METHOD AND SYSTEM FOR PERFORMING QUERIES ON DATA STREAMS

(75) Inventors: Nikolaos Koudas, Toronto (CA); Divesh Srivastava, Summit, NJ (US); David Toman, Waterloo (CA)

(73) Assignee: AT&T Intellectual Property II, L.P., Reno, NV (US)

( * ) Notice: Subject to any disclaimer, the term of this patent is extended or adjusted under 35 U.S.C. 154(b) by 172 days.

(21) Appl. No.: 11/411,478

(22) Filed: Apr. 26, 2006

(51) Int. Cl.
G06F 7/00 (2006.01)

(52) U.S. Cl. .......... 707/713; 707/718; 707/899; 707/922

(58) Field of Classification Search ........................ 707/2
See application file for complete search history.

(56) References Cited

U.S. PATENT DOCUMENTS

| | | | |
|---|---|---|---|
| 6,032,144 | A | 2/2000 | Srivastava et al. |
| 6,061,676 | A | 5/2000 | Srivastava et al. |
| 6,449,609 | B1 | 9/2002 | Witkowski |
| 6,542,886 | B1 | 4/2003 | Chaudhuri et al. |
| 6,760,724 | B1 | 7/2004 | Chakrabarti et al. |
| 6,912,524 | B2 | 6/2005 | Acharya et al. |
| 6,947,927 | B2 | 9/2005 | Chaudhuri et al. |
| 6,986,019 | B1 | 1/2006 | Bagashev et al. |
| 7,184,998 | B2 * | 2/2007 | Nica ................................. 707/2 |
| 2004/0117359 | A1 * | 6/2004 | Snodgrass et al. ................. 707/3 |
| 2005/0166082 | A1 | 7/2005 | Williams et al. |
| 2006/0143170 | A1 * | 6/2006 | Ganguly et al. ................... 707/5 |
| 2006/0161566 | A1 * | 7/2006 | Dobra et al. ................... 707/101 |

OTHER PUBLICATIONS

Author: Chuck Cranor, Ted Johnson and Oliver Spatscheck Title: Gigascope: How to monitor network traffic 5Gbiit/sec at a time Date: Jun. 2003 Publisher: AT&T Pertinent pp. 1-29.*

Author: Houghton Mifflin Company Title: The American Heritage Dictionary of teh English Language Date: 2000 Publisher: Houghton Mifflin Company Edition: Fourth Edition Pertinent Page: Page 1 (as in attached pdf file).*

Author: Alin Dobra, Minos Garofalakis, Johannes Gehrke, Rajeev Rastogi; Title: Processing Complex Aggregate Queries over Data Streams; Date: year 2002; Publisher: ACM SIGMOD; Pertinent pp. 1-12 (whole attached pdf).*

* cited by examiner

*Primary Examiner* — Tim T. Vo
*Assistant Examiner* — Anh Tai V Tran

(57) ABSTRACT

A method and system for performing a data stream query. A data stream query requiring a join operation on multiple data streams is approximated without performing the join operation. It is determined whether conditions of the query are proper to accurately approximate the join operation, and if the conditions are proper the join operation is approximated. The join operation is approximated by independently aggregating values of the data streams and comparing the independently aggregated values.

15 Claims, 3 Drawing Sheets

METHOD AND SYSTEM FOR PERFORMING QUERIES ON DATA STREAMS

BACKGROUND OF THE INVENTION

The present invention is generally directed to performing queries on data streams. More specifically, the present invention is directed to a method and system for eliminating join operations from queries on data streams by approximating the join operations.

Typically, databases are used to store large amounts of data. A database query is used to analyze the data stored in a database. More particularly, a database query specifies a result to be calculated using the data stored in the database. A database query is often specified using structured query language (SQL). Join operations are common in database queries. Join operations join multiple tables of a database by requesting data from one table that matches data from another table.

Data streams are sequences of data used to transmit or receive information. Data streams are used to transmit large amounts of data in a small amount of time. Examples of data streams include network traffic, financial data such as stock market data, sensor readings, military data, etc. Typically, it is impossible or inconvenient to store all of the data received in a data stream due to the large amounts of data being transmitted. However, it is often necessary to analyze this data. A data stream management system (DSMS) is typically a computer program which monitors data streams and performs operations on the data in data streams. In a conventional DSMS, queries are performed on data streams arriving at the DSMS. In order to perform the queries, data from the data streams is temporarily stored and then deleted after the query is completed.

Because an entire data stream is likely to be too large to process at once, continuous queries are used to perform queries on data streams. In performing a continuous query, a DSMS continuously evaluates data in a data stream as it arrives and reports results of the query over a specified time window or grouping granularity. Queries requiring join operations on data streams often have temporal join conditions which requests matching data from one stream with data from another stream arriving within a specified time. Therefore, the DSMS must store data from each arriving stream for the duration of the temporal join condition or until a match is found, and compare each piece of data arriving for each stream with the data stored for the other streams to determine if a match exists. As the speed of data streams increase, the amount of data stored in order to perform a join operation increases. Accordingly, the storage and computational costs of join operations make join operations inefficient or impossible in high speed data stream applications. For example, a network router can forward packets at a great speed, typically spending a few hundred nanoseconds per packet. In order for a DSMS to perform a query requiring a join operation joining multiple streams of packets, even if the temporal join condition is only a few seconds, the storage and computational requirements needed to perform the join operation would make this operation infeasible.

Accordingly, it is desirable to perform queries on data streams without performing join operations. Furthermore, it is desirable to accurately approximate the join operations without using the storage and computational resources required to perform the join operations.

BRIEF SUMMARY OF THE INVENTION

The present invention provides a method of performing queries on data streams without performing join operations. This is accomplished by forming a query plan which approximates the results of a query requiring a join operation on multiple data streams by independently aggregating the data streams, and executing the query plan to approximate the results of the query.

In one embodiment of the present invention, a data stream management system (DSMS) receives a query requiring a join operation joining multiple data streams and requiring computing aggregates of the joined data streams. The DSMS determines whether a join operation can be approximated, within a certain error threshold, by a query using logical inference on a join condition and a grouping granularity of the join operation with integrity constraints of the data streams. If the DSMS determines that the join operation can be accurately approximated, the DSMS approximates the join operation by performing independent aggregation operations on the data streams and comparing the results of the aggregation operations.

The present invention can also be applied to complex queries involving more than one join operation. When a query requires more than one join operation, it is determined which of the join operations can be accurately approximated. The DSMS then develops a plan which eliminates the join operations which can be accurately approximated and performs the join operations which cannot be accurately approximated. The plan is performed to accurately approximate the result of the complex query while saving resources by eliminating as many join operations as possible.

These and other advantages of the invention will be apparent to those of ordinary skill in the art by reference to the following detailed description and the accompanying drawings.

DETAILED DESCRIPTION

Figure 1:
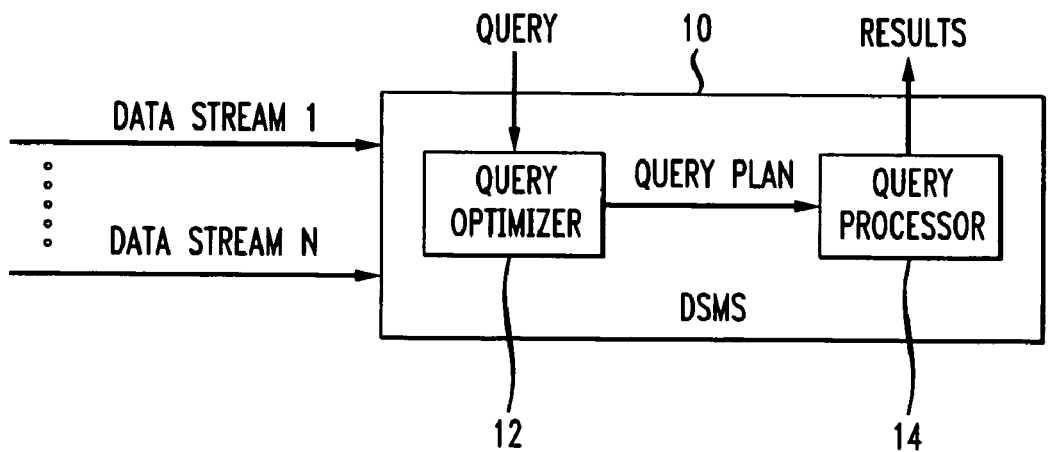
FIG. 1 illustrates a data stream management system to perform a data stream query according to an embodiment of the present invention.

FIG. 1 illustrates a data stream management system (DSMS) 10 which monitors and processes data streams. As illustrated in FIG. 1, the DSMS 10 receives queries and processes the data streams to answer the queries. The DSMS 10 includes a query optimizer 12 which determines a plan to execute a query submitted to the DSMS 10. The query optimizer 12 receives an input query, develops various possible plans to execute the query, evaluates the possible plans, and selects the best possible plan. A query processor 14 then executes the plan selected by the query optimizer 12 and outputs the results of the executed plan. According to the present invention, when a query submitted to the DSMS 10 requires a join operation to join multiple data streams, the query optimizer 12 develops a plan which eliminates the join operation by approximating the join operation without joining the data streams. If the query optimizer 12 determines that proper conditions exist to approximate the join operation, the query optimizer selects the plan which eliminates the join operation. The query optimizer 12 performs a similar operation to eliminate anti-join operations in queries when proper conditions exist to approximate the anti-join operations. A query requires an anti-join operation when the query requests data in a data stream that does not match data in another data stream. Hereinafter, the term "join operation" refers to both join and anti-join operations. Furthermore, join operations can be used to join multiple data streams or multiple substreams of a data stream. The query received by the DSMS 10 can be input by a user or formed by an application and transmitted to the DSMS 10.

Figure 5:
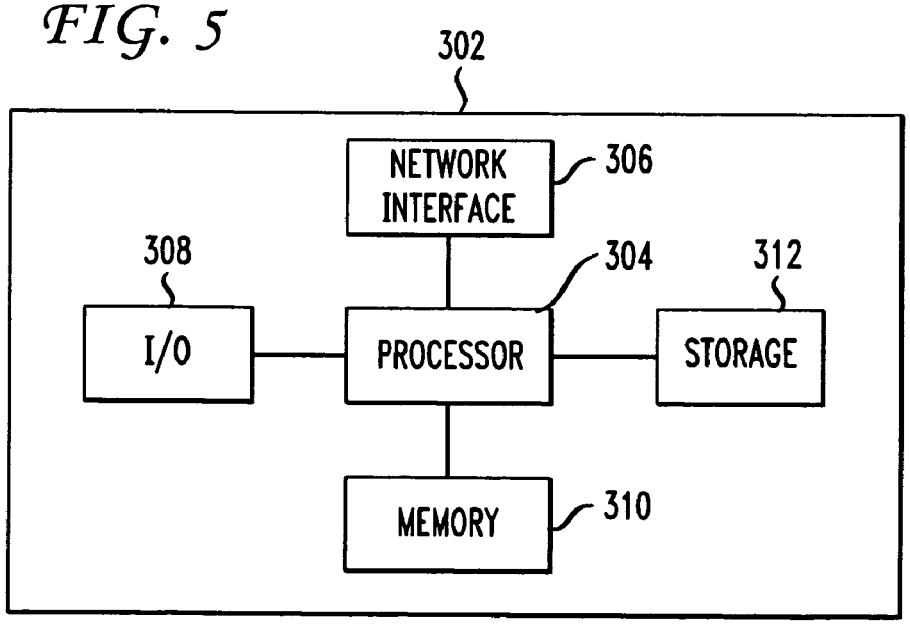
FIG. 5 illustrates a high level block diagram of a computer capable of implementing a method of performing a data stream query according to an embodiment of the present invention.

The DSMS 10 can be implemented as a computer program executed by or used with a device, which receives data streams. For example, the DSMS 10 may be implemented on a computer using well known computer processors, memory units, storage devices, computer software, and other components. A high level block diagram of such a computer is illustrated in FIG. 5. Computer 302 contains a processor 304 which controls the overall operation of the computer 302 by executing computer program instructions which define such operation. The computer program instructions may be stored in a computer readable storage medium, such as storage device 312 (e.g., magnetic disk) and loaded into memory 310 when execution of the computer program instructions is desired. Thus, the DSMS application can be defined by the computer program instructions stored in the memory 310 and/or storage 312 and the DSMS application will be controlled by the processor 304 executing the computer program instructions. The computer 302 also includes one or more network interfaces 306 for communicating with other devices via a network. The computer 302 also includes input/output 308 which represents devices which allow for user interaction with the computer 302 (e.g., display, keyboard, mouse, speakers, buttons, etc.). One skilled in the art will recognize that an implementation of an actual computer will contain other components as well, and that FIG. 5 is a high level representation of some of the components of such a computer for illustrative purposes.

Figure 2:
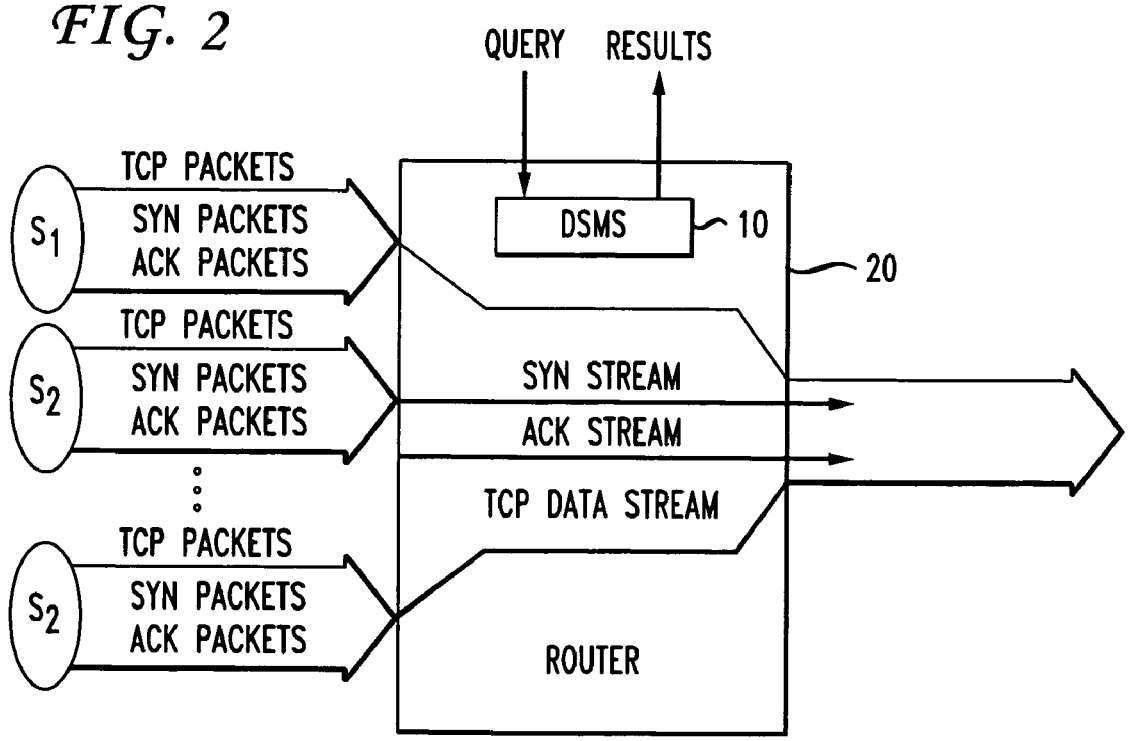
FIG. 2 illustrates a network router used with a data stream management system according to an embodiment of the present invention.

FIG. 2 illustrates an example of the DSMS 10 being used with a network router 20. The router 20 receives data packets and forwards the data packets to various destinations. As illustrated in FIG. 2, the router 20 receives transmission control protocol (TCP) packets from multiple sources (S1-SN) and forms a stream of the TCP packets to forward the TCP packets at a high speed. TCP is used to establish a connection between a client and a server. When a client attempts to establish a connection with a server, the client sends a SYN (synchronization) packet to the server. The server then returns a SYN/ACK (synchronization acknowledged) packet to the client. The client then acknowledges the receipt of the SYN/ACK packet with an ACK (acknowledged) packet to complete the 3-way handshake and establish the connection. Accordingly, the stream of TCP packets includes a substream of SYN packets and a substream of corresponding ACK packets. The SYN/ACK packets are not shown in this example. Each of the SYN and the ACK packets have IP address attributes sourceIP and destIP (collectively referred to as "ip" here), representing the source and destination addresses of the packet, and a timestamp attribute (time), representing the time of arrival of the packet in the data stream.

The DSMS 10 can be stored and executed on the router 20 or stored and executed on a computer connected to the router via a network. As the streams of SYN and ACK packets flow through the router 20, the DSMS 10 can monitor and process the SYN and ACK streams in order to execute queries on the SYN and ACK streams. The DSMS 10 uses the ip and time attributes as schema to execute the queries on the SYN and ACK streams.

Figure 3:
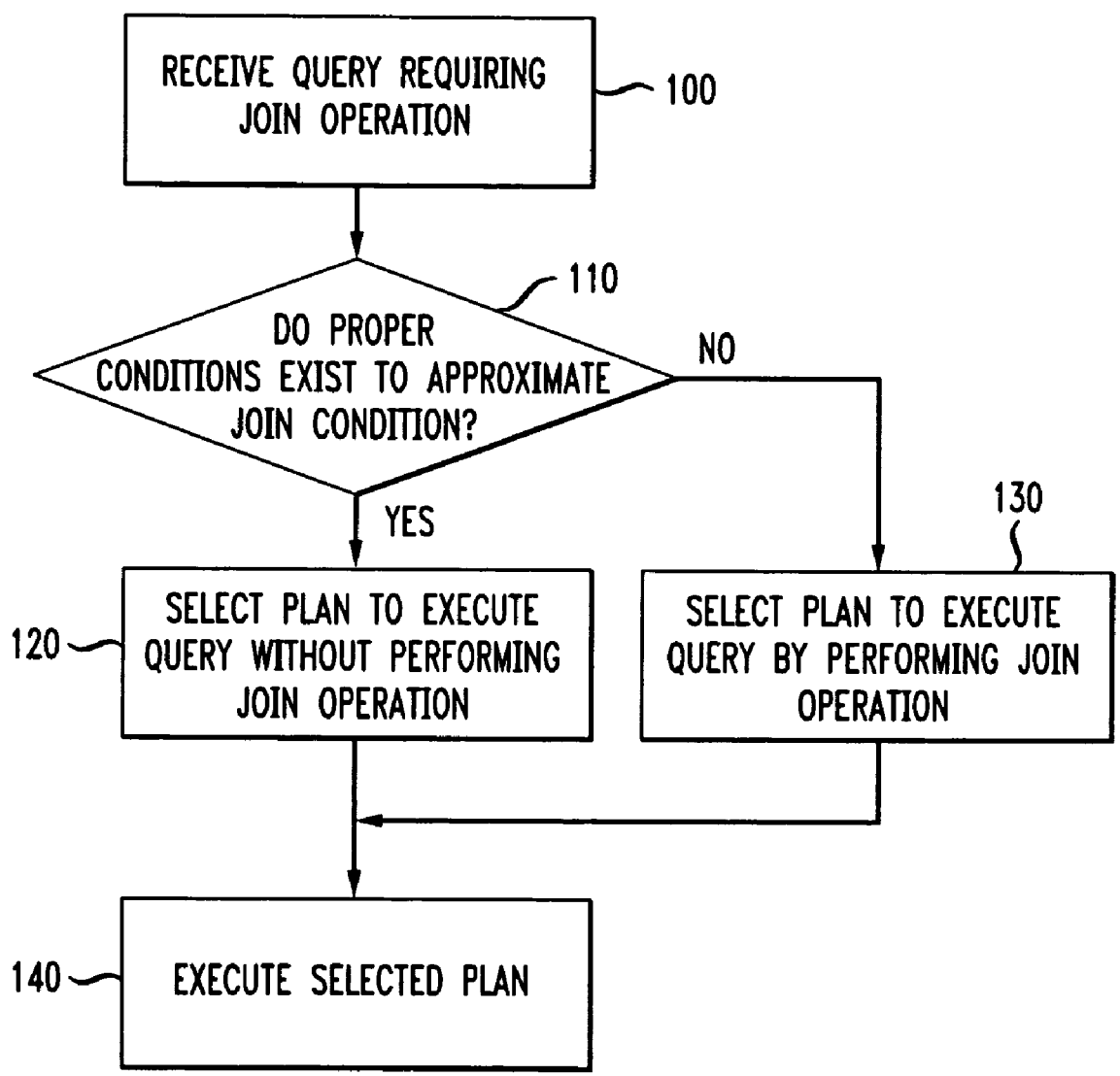
FIG. 3 illustrates a method of performing a data stream query according to an embodiment of the present invention.

FIG. 3 illustrates a method of executing a data stream query according to an embodiment of the present invention. This method can be performed by a DSMS 10, as illustrated in FIGS. 1 and 2. In order to assist in understanding the present invention, this method will be described with reference to the example of FIG. 2. However, the present invention is not limited to the example of FIG. 2 and can be applied to the execution of data stream queries on any types of data streams. For example, in addition to network traffic, this method can be applied to financial applications such as stock market data, military data, sensor readings, etc.

Referring to FIG. 3, at step 100, the DSMS 10 receives a query requiring a join operation involving multiple data streams. More particularly, the query involves joining multiple data streams using a temporal join condition and computing aggregates of the joined data streams over temporal grouping granularity. The temporal join condition is a time limit to look for matching data in the multiple data streams, and the temporal grouping granularity is a time interval for reporting the results of the query. For example, referring to the example of FIG. 2, the DSMS 10 can receive a query that asks, "For each 5 minute interval, how many SYN packets do not have a matching ACK packet within 5 seconds?" This query can be used to identify a SYN-flood based denial of service (DOS) attack. In this query the temporal join condition is 5 seconds and the temporal grouping granularity is 5 minutes. In order to execute this query exactly as requested, the DSMS 10 would have to store every SYN packet arriving in the router 20 in the SYN stream until it finds a subsequent matching ACK packet or 5 seconds elapses, and match every ACK packet arriving in the router 20 in the ACK stream with a SYN packet stored within the previous 5 seconds. This can be inefficient or unfeasible, both from storage and computational perspectives when dealing with traffic in a high speed network.

Figure 4:
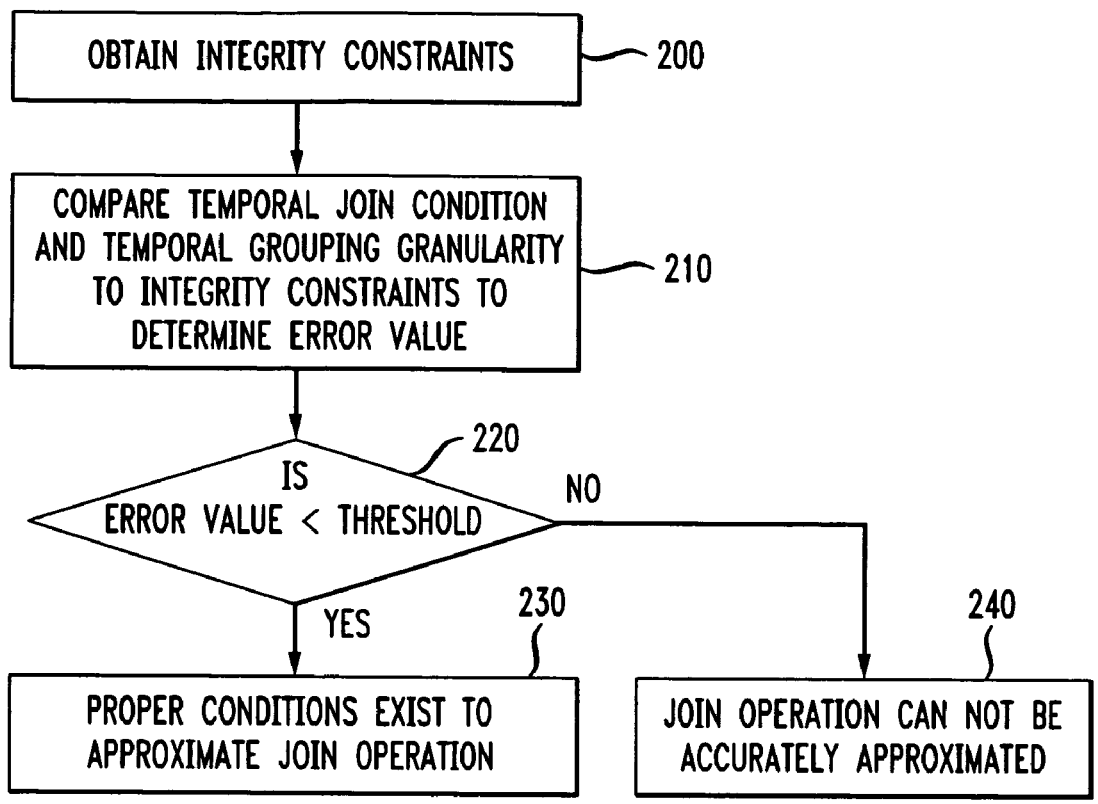
FIG. 4 illustrates a method of determining whether proper conditions exist to approximate a join operation according to an embodiment of the present invention.

At step 110, the DSMS 10 determines whether proper conditions exist to approximate the join operation required by the received query. More particularly, the DSMS 10 determines whether the join operation can be accurately approximated. The DSMS 10 determines whether the join operation can be accurately approximated based on the temporal join condition, the temporal grouping granularity, and integrity constraints of the data streams. FIG. 4 illustrates this step in greater detail. Referring to FIG. 4, at step 200, the DSMS 10 obtains integrity constraints associated with the data streams specified in the query. Integrity constraints are properties of the data streams that can be used to predict behavior of the data streams. The DSMS 10 can have integrity constraints pre-stored therein and retrieve the integrity constraints associated with the data streams in the query, or the DSMS 10 can obtain the integrity constraints through data mining techniques.

The DSMS 10 can obtain the integrity constraints for the SYN and ACK streams from TCP specifications. For example, the DSMS 10 can obtain the following integrity constraints for the SYN and ACK packets:

(i) In both SYN and ACK streams, the ip attribute can serve as an identifier of a TCP connection (a key) for the duration of a connection (but it is not a key in general as there may be multiple consecutive connections between a particular source-destination pair of IP addresses).

(ii) For every legitimate TCP connection, there is a single SYN packet and a signal ACK packet. However, the ACK packet may be missing (e.g., in a DOS attack).

(iii) The SYN and ACK packets belonging to the same TCP flow are temporally collocated in the two streams and appear within 1 second apart in most cases.

The integrity constraints are expressed in terms of temporal properties that apply to the elements of the data streams. In order to express the integrity constraints, additional conceptual schema may be created. For example, in the above constraints, because the ip attribute is an identifier of a TCP flow within a limited time window, a connection identifier (id) attribute can be created to identify the TCP flow from which the respective packet is from. The id attribute does not actually exist in the TCP flow, it is solely used by the DSMS 10 to specify integrity constraints that apply to one or both of the streams. With the modified schema being specified in the form: SYN(time, id, ip) and ACK(time, id, ip), the integrity constraints can be expressed as:

$$SYN(t_i, i, a_1) \wedge SYN(t_2, i, a_2) \rightarrow a_1 = a_2 \wedge t_1 = t_2$$

$$ACK(t_1, i, a_1) \wedge ACK(t_2, i, a_2) \rightarrow a_1 = a_2 \wedge t_1 = t_2$$

$$SYN(t_i, i, a_1) \wedge ACK(t_2, i, a_2) \rightarrow a_1 = a_2 \wedge t_2 \geq t_1$$

$$SYN(t_1, i, a_1) \wedge SYN(t_2, i_2, a_2) \wedge (t_2 \geq t_1) \wedge (t_2 - t_1 \leq 10) \rightarrow i_1 = i_2$$

$$ACK(t_1, i, a) \rightarrow \exists t_2 \cdot SYN(t_2, i, a) \wedge (t_1 \geq t_2) \wedge (t_1 - t_2 \leq 1)$$

Additional implied integrity constraints may exist that are logical consequences of the integrity constraints given for the streams. Accordingly, a logical implication problem to determine implied integrity constraints can be converted into a satisfiability problem which is solved to determine any additional implied integrity constraints.

At step 210, the temporal join condition and the temporal grouping granularity are compared to the integrity constraints of the data streams to determine an error value. This error value represents error in approximating the join operation due to temporal boundary conditions of the query. For example, if the temporal join condition is e and the grouping granularity is k, when the temporal join condition e is greater than the temporal condition mentioned in the integrity constraint, the error value can be given by e/k assuming uniformity of packet arrival over k time units. In the above example, e=5 seconds, k=5 minutes (300 seconds), and the temporal condition of the integrity constraint is 1 second. Accordingly, e is greater than temporal condition of the integrity constraint, so the error is determined to be 5/300.

At step 220, the error value calculated in step 210 is compared to a threshold. If the error value is less than the threshold, the DSMS 10 determines that proper conditions exist to accurately approximate the join operation at step 230. If the error value is not less than the threshold, the DSMS 10 determines that the join operation cannot be accurately approximated at step 240. The threshold corresponds to a percentage of error acceptable in the approximation of the join operation. The threshold may be specified by a user of the DSMS 10 or an application used with the DSMS 10.

Returning to FIG. 3, if the DSMS 10 determines that the proper conditions exist to approximate the join operation at step 110, the method proceeds to step 120. At step 120, the DSMS develops and selects a plan to execute the query without performing the join operation. The DSMS can approximate the join operation by independently aggregating the data streams specified in the query over the temporal grouping granularity. For example, if the query asks, "for each 5 minute interval, how many SYN packets do not have a matching ACK packet within 5 seconds?" as described above, the DSMS 10 can develop a plan to answer a hypothetical query, "for every 5 minute interval, report the difference between the total number of SYN packets and the total number of ACK packets in that interval, provided that number is positive." The hypothetical query does not join the SYN and ACK streams because the aggregates of the streams are independently calculated in the 5 minute interval. The plan to execute this hypothetical query does not cost as much in terms of storage and calculation to perform as a plan to execute the original query with the join operation.

If the DSMS 10 determines that the join operation cannot be accurately approximated at step 110, the method proceeds to step 130. At step 130, the DSMS 10 selects a plan to perform the query by performing the join operation.

At step 140, the DSMS 10 performs the query by executing the selected plan. Accordingly, if the DSMS 10 determines that the join operation can be accurately approximated at step 110, the DSMS executes the plan selected at step 120 which eliminates the join operation, and if the DSMS determines that the join operation cannot be accurately approximated at step 110, the DSMS 10 executes the plan selected at step 130 including the join operation.

As described above, the method of FIG. 3 is described referring to executing a query with a join operation. However, the present invention is not limited to queries with one join operation, but may be applied to complex queries with multiple join operations. Accordingly, in a complex query, the DSMS 10 evaluates each join operation required to determine the join operations that can be accurately approximated. The DSMS 10 then selects a plan to execute the query which eliminates the join operations which can be accurately approximated and includes the join operations which cannot be accurately approximated.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method of performing a data stream query, comprising:

receiving at a network router the data stream query requiring a join operation on a plurality of data streams, wherein the query requires a join operation involving joining the plurality of data streams using a temporal join condition and computing aggregates of the joined data streams over the temporal grouping granularity;

determining whether the join operation can be accurately approximated when the query is received by:

comparing the temporal join condition and the temporal grouping granularity of the join operation with integrity constraints of the data streams to determine an error value; and when the error value is less than a threshold value, determining that the join operation can be accurately approximated;

generating a plan to approximate results of the received query without performing a join operation by performing independent aggregation operations on each of the plurality of data streams, wherein the independent aggregation operations independently aggregate all values of each of the plurality of data streams over a temporal grouping granularity; and performing the generated plan on the plurality of data streams; and outputting results of the performed plan from the network router as results of the query.

2. The computer-implemented method of claim 1, wherein generating a plan to approximate results of the received query without performing a join operation comprises:

approximating the join operation by independently aggregating all values of each of the plurality of data streams over the temporal grouping granularity, and comparing the results of the independently aggregated values.

3. The computer-implemented method of claim 1, wherein comparing the temporal join condition and the temporal grouping granularity of the join operation with integrity constraints of the data streams comprises:

obtaining integrity constraints of the data streams;

expressing the integrity constraints in terms of temporal properties that apply to the data streams; and comparing the integrity constraints with the temporal join condition and the temporal grouping granularity of the join operation.

4. The computer-implemented method of claim 1, wherein comparing the temporal join condition and the temporal grouping granularity of the join operation with integrity constraints of the data streams comprises:

obtaining integrity constraints of the data streams;

determining implied integrity constraints logically implied by the obtained integrity constraints; and comparing the temporal join condition and the temporal grouping granularity of the join operation with the obtained integrity constraints and the implied integrity constraints.

5. The computer-implemented method of claim 1, wherein the plurality of data streams comprises a data stream of SYN packets and a data stream of ACK packets.

6. A computer-implemented method of performing a data stream query, comprising:

receiving at a network router the data stream query requiring a join operation on a plurality of data streams;

generating a plan to approximate results of the received query without performing a join operation by performing independent aggregation operations on each of the plurality of data streams, wherein the independent aggregation operations independently aggregate all values of each of the plurality of data streams over a temporal grouping granularity;

performing the generated plan on the plurality of data streams; and outputting results of the performed plan from the network router as results of the query;

wherein the query requires a plurality of join operations, and generating a plan to approximate the results of the received query without performing a join operation comprises:

determining which of the join operations can be accurately approximated; and generating a plan to approximate the join operations which can be accurately approximated and to perform the join operations which cannot be accurately approximated.

7. The computer-implemented method of claim 6, wherein the plurality of data streams comprises a data stream of SYN packets and a data stream of ACK packets.

8. An apparatus for executing a data stream management system to perform a data stream query requiring a join operation on a plurality of data streams, wherein the data stream query requires a join operation involving joining the plurality of data streams using a temporal join condition and computing aggregates of the joined data streams over the temporal grouping granularity, the apparatus comprising:

means for determining whether the join operation can be accurately approximated, comprising:

means for comparing the temporal join condition and the temporal grouping granularity of the join operation with integrity constraints of the data streams to determine an error value; and means for determining that proper conditions exist to approximate the join operation when the error value is less than a predetermined threshold value;

means for generating a plan to approximate results of the data stream query without performing a join operation by performing independent aggregation operations on each of the plurality of data streams, wherein the independent aggregation operations independently aggregate all values of each of the plurality of data streams over a temporal grouping granularity; and means for performing the generated plan on the plurality of data streams.

9. The apparatus of claim 8, wherein the plurality of data streams comprises a data stream of SYN packets and a data stream of ACK packets.

10. An apparatus for executing a data stream management system to perform a data stream query requiring a join operation on a plurality of data streams, the apparatus comprising:

means for generating a plan to approximate results of the data stream query without performing a join operation by performing independent aggregation operations on each of the plurality of data streams, wherein the independent aggregation operations independently aggregate all values of each of the plurality of data streams over a temporal grouping granularity; and means for performing the generated plan on the plurality of data streams; wherein the query requires a plurality of join operations, and the means for generating a plan to approximate the results of the received query without performing a join operation comprises:

means for determining which of the join operations can be accurately approximated; and means for generating a plan to approximate the join operations which can be accurately approximated and to perform the join operations which cannot be accurately approximated.

11. The apparatus of claim 10, wherein the plurality of data streams comprises a data stream of SYN packets and a data stream of ACK packets.

12. A non-transitory computer readable storage medium storing computer program instructions for performing a computer-implemented method of performing a query received at network router requiring a join operation on a plurality of data streams, the computer program instructions defining the steps comprising:

determining whether the join operation can be accurately approximated by:

comparing a temporal join condition and a temporal grouping granularity of the join operation with integrity constraints of the data streams to determine an error value; and when the error value is less than a threshold value, determining that the join operation can be accurately approximated;

generating a plan to approximate results of the query without performing a join operation by performing independent aggregation operations on each of the plurality of data streams, wherein the independent aggregation operations independently aggregate all values of each of the plurality of data streams over the temporal grouping granularity; and executing the generated plan on the plurality of data streams; and outputting results of the performed plan from the network router as results of the query.

13. The non-transitory computer readable storage medium of claim 12, wherein the plurality of data streams comprises a data stream of SYN packets and a data stream of ACK packets.

14. A non-transitory computer readable storage medium storing computer program instructions for performing a computer-implemented method of performing a query received at network router requiring a join operation on a plurality of data streams, the computer program instructions defining the steps comprising:

generating a plan to approximate results of the query without performing a join operation by performing independent aggregation operations on each of the plurality of data streams, wherein the independent aggregation operations independently aggregate all values of each of the plurality of data streams over a temporal grouping granularity;

executing the generated plan on the plurality of data streams; and outputting results of the performed plan from the network router as results of the query;

wherein the query requires a plurality of join operations, and the computer program instructions defining the step of generating a plan to approximate the results of the received query without performing a join operation comprise computer program instructions defining the steps of:

determining which of the join operations can be accurately approximated; and generating a plan to approximate the join operations which can be accurately approximated and to perform the join operations which cannot be accurately approximated.

15. The non-transitory computer readable storage medium of claim 14, wherein the plurality of data streams comprises a data stream of SYN packets and a data stream of ACK packets.

* * * * *